United States Patent
Fang et al.

(10) Patent No.: US 10,794,421 B2
(45) Date of Patent: Oct. 6, 2020

(54) APPARATUS AND METHOD FOR PRELOADING BEARING ASSEMBLIES

(71) Applicant: The Timken Company, North Canton, OH (US)

(72) Inventors: Min Fang, Shanghai (CN); Jianguo Lu, Jiangsu (CN); Xianghua Zhou, Shanghai (CN)

(73) Assignee: The Timken Company, North Canton, OH (US)

( * ) Notice: Subject to any disclaimer, the term of this patent is extended or adjusted under 35 U.S.C. 154(b) by 3 days.

(21) Appl. No.: 16/079,788

(22) PCT Filed: Mar. 1, 2016

(86) PCT No.: PCT/CN2016/075056
§ 371 (c)(1),
(2) Date: Aug. 24, 2018

(87) PCT Pub. No.: WO2017/147766
PCT Pub. Date: Sep. 8, 2017

(65) Prior Publication Data
US 2019/0072129 A1    Mar. 7, 2019

(51) Int. Cl.
*F16C 39/04*    (2006.01)
*F16C 25/06*    (2006.01)
(Continued)

(52) U.S. Cl.
CPC ............ *F16C 25/06* (2013.01); *F16C 19/364* (2013.01); *F16C 35/07* (2013.01); *F16C 35/078* (2013.01);
(Continued)

(58) Field of Classification Search
CPC ........ B23P 19/067; B25B 29/02; F16C 25/06; F16C 25/08; F16C 25/083; F16C 25/086;
(Continued)

(56) References Cited

U.S. PATENT DOCUMENTS 3,304,139 A    2/1967  Toth et al.
4,542,661 A *  9/1985  Teramachi ............. B23Q 5/402
                                                          74/424.75
(Continued)

FOREIGN PATENT DOCUMENTS

CN    203035711 U    7/2013
CN    203614599 U    5/2014
(Continued)

OTHER PUBLICATIONS

International Search Report and Written Opinion of PCT/CN20161075056, dated Dec. 7, 2016 (12 pages).
(Continued)

*Primary Examiner* — Sarang Afzali
*Assistant Examiner* — Darrell C Ford
(74) *Attorney, Agent, or Firm* — Michael Best & Friedrich LLP

(57) ABSTRACT

An apparatus for preloading a bearing assembly on a shaft includes a first annular threaded member positioned about the shaft and a second annular threaded member positioned about the shaft. The first and second threaded members have intermeshing threads such that rotation of the second threaded member causes axial translation of the first threaded member to apply a first axial force to the bearing assembly to preload the bearing assembly. An actuator is operable to rotate the second threaded member relative to the first threaded member to apply the first axial force to the bearing assembly.

23 Claims, 6 Drawing Sheets

(51) Int. Cl.
*F16C 35/07* (2006.01)
*F16C 19/36* (2006.01)
*F16C 35/078* (2006.01)
*F16C 35/063* (2006.01)
*F16C 19/52* (2006.01)

(52) U.S. Cl.
CPC ............ *F16C 39/04* (2013.01); *F16C 19/522* (2013.01); *F16C 35/063* (2013.01); *F16C 2226/10* (2013.01); *F16C 2229/00* (2013.01); *F16C 2300/02* (2013.01); *F16C 2300/14* (2013.01); *F16C 2360/31* (2013.01)

(58) Field of Classification Search
CPC ...... F16C 35/078; F16C 39/04; F16C 19/364; F16C 35/07; F16C 2300/02; F16C 2360/31; F16C 19/522; F16C 35/063; F16C 2226/10; F16C 2229/00; F16C 2300/14
USPC .............................................. 81/57.38, 57.39
See application file for complete search history.

(56) References Cited

U.S. PATENT DOCUMENTS

| | | | |
|---|---|---|---|
| 4,657,412 A | | 4/1987 | McLarty et al. |
| 5,029,461 A | | 7/1991 | Lawrence et al. |
| 5,153,990 A | | 10/1992 | Martinie |
| 5,564,840 A | * | 10/1996 | Jurras .................. F16C 25/083 29/898.09 |
| 5,662,445 A | | 9/1997 | Harbottle et al. |
| 5,685,068 A | | 11/1997 | Bankestrom et al. |
| 5,857,783 A | | 1/1999 | Johansson et al. |
| 5,876,127 A | | 3/1999 | Casey |
| 6,170,987 B1 | | 1/2001 | Huang et al. |
| 6,892,562 B2 | | 5/2005 | Gethings |
| 8,151,465 B2 | | 4/2012 | Hewitt |
| 8,832,921 B2 | * | 9/2014 | Marks ...................... B02C 2/04 29/525.02 |
| 8,858,382 B2 | | 10/2014 | Smith |
| 9,829,047 B2 | * | 11/2017 | Durling .................. F01D 5/025 |
| 10,221,969 B2 | * | 3/2019 | Stewart .................... H02G 3/22 |
| 2007/0211973 A1 | | 9/2007 | Rode |
| 2011/0193500 A1 | * | 8/2011 | Seto .................... F16H 25/2266 318/14 |
| 2012/0237152 A1 | | 9/2012 | Wheals |
| 2013/0152372 A1 | | 6/2013 | Marks et al. |
| 2015/0330488 A1 | * | 11/2015 | Combernoux ...... F16H 25/2252 74/89.23 |
| 2020/0173494 A1 | * | 6/2020 | Smith .................... H02K 7/088 |
| 2020/0200214 A1 | * | 6/2020 | Kracke ................... F16C 27/08 |

FOREIGN PATENT DOCUMENTS

| | | |
|---|---|---|
| CN | 104500587 A | 4/2015 |
| CN | 105026776 A | 11/2015 |
| JP | 2001336606 A | 12/2001 |
| JP | 2008215589 A | 9/2008 |
| JP | 2008240915 A | 10/2008 |
| WO | 2011033256 A1 | 3/2011 |

OTHER PUBLICATIONS

Chinese Patent Office Action for Application No. 201680083035.3 dated May 17, 2019 (15 pages, English translation included).
European Patent Office Extended Search Report for Application No. 16891959.5 dated Sep. 16, 2019 (9 pages).

* cited by examiner

APPARATUS AND METHOD FOR PRELOADING BEARING ASSEMBLIES

BACKGROUND

The present invention relates to bearings and, more particularly, to apparatuses for preloading bearings.

Bearings are positioned on shafts to provide rotation of a component relative to the shaft. In some examples, a preload or permanent thrust load is applied to the bearings to remove axial and radial clearance within the bearing. In large-scale applications (e.g., wind turbines, off-highway or large gear drive applications, etc.), bearings require a large and yet accurate preload force. In current operation, a preload spacer is clamped to provide the preload force. However, in order to provide the appropriate preload force, the height of the spacer is required to be incredibly accurate (e.g., on the order of microns). Therefore, the spacer often requires regrinding on site, resulting in a low efficiency process that depends greatly on the skills of the installer.

SUMMARY

In one construction, the invention provides an apparatus for preloading a bearing assembly on a shaft. The apparatus comprises a first annular threaded member positioned about the shaft and a second annular threaded member positioned about the shaft. The first and second threaded members have intermeshing threads such that rotation of the second threaded member causes axial translation of the first threaded member to apply a first axial force to the bearing assembly to preload the bearing assembly. An actuator is operable to rotate the second threaded member relative to the first threaded member to apply the first axial force to the bearing assembly.

In another construction, the invention provides a method of preloading a bearing assembly on a shaft. A first annular threaded member is rotationally fixed relative to the shaft to prevent rotation of the first threaded member about the shaft. A second annular threaded member is threadably engaged to the first threaded member. The second threaded member is rotated relative to the first threaded member such that axial movement of the first threaded member applies a first axial force to the bearing assembly to preload the bearing assembly.

In another construction, the invention provides an apparatus for preloading a bearing assembly on a shaft. The apparatus comprises a first annular threaded member positioned about the shaft and a second annular threaded member positioned about the shaft. The first and second threaded members have intermeshing threads such that rotation of the second threaded member causes axial translation of the first threaded member to apply a first axial force to the bearing assembly to preload the bearing assembly. A plurality of linear actuators provide a second axial force to one of the first and second threaded members, the second axial force applied in a direction that reduces friction between the intermeshing threads.

In another construction, the invention provides a method of preloading a bearing assembly on a shaft. A first annular threaded member is rotationally fixed relative to the shaft to prevent rotation of the first threaded member about the shaft. A second annular threaded member is threadably engaged to the first threaded member. The second threaded member is rotated relative to the first threaded member such that axial movement of the first threaded member applies a first axial force to the bearing assembly to preload the bearing assembly. A second axial force is applied to one of the first and second threaded members, the second axial force applied in a direction that reduces friction between the threaded engagement of the first and second threaded members as the second threaded member is rotated.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
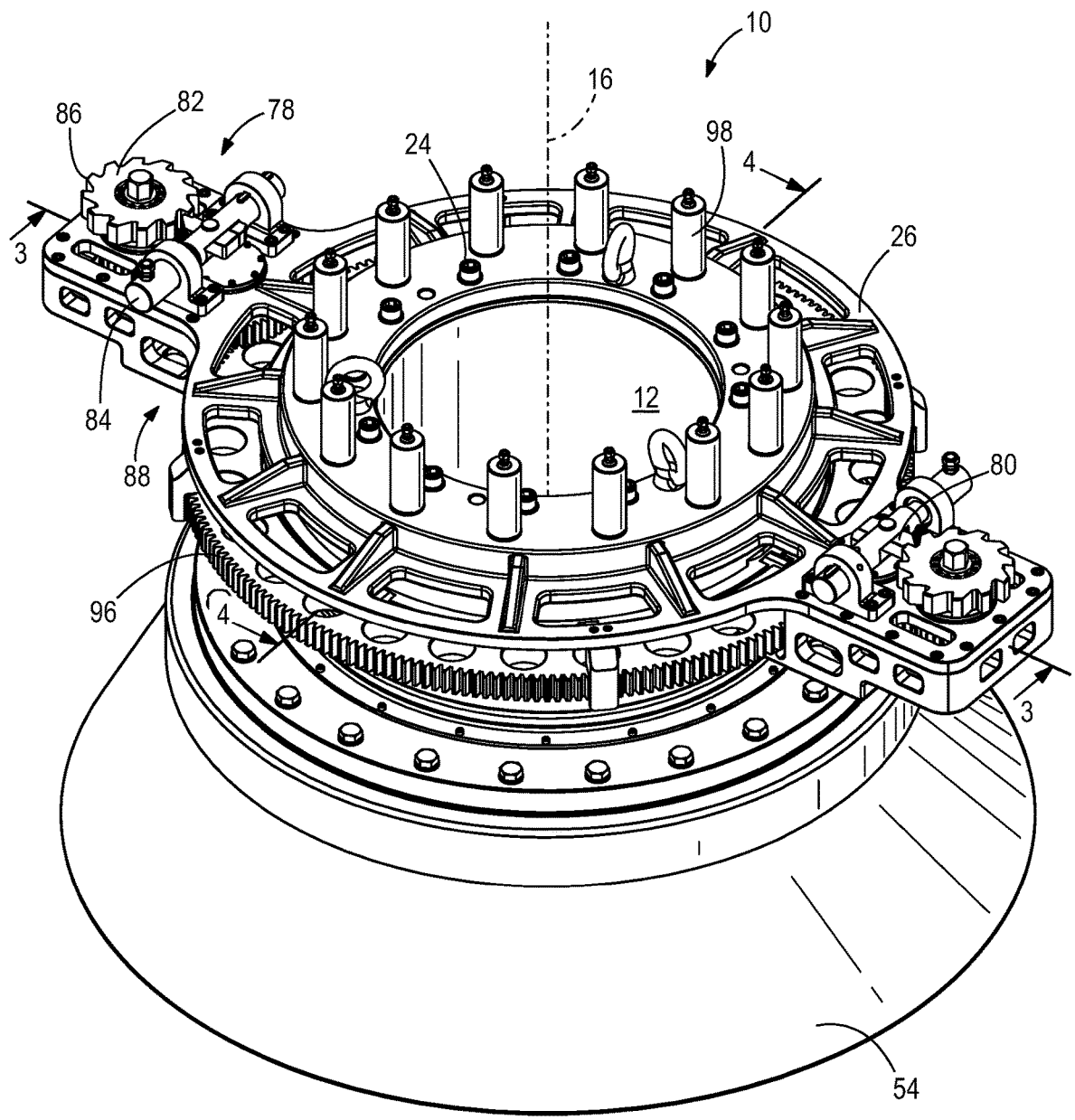
FIG. 1 is a perspective view of a preloading apparatus according to one embodiment of the invention.
Figure 2:
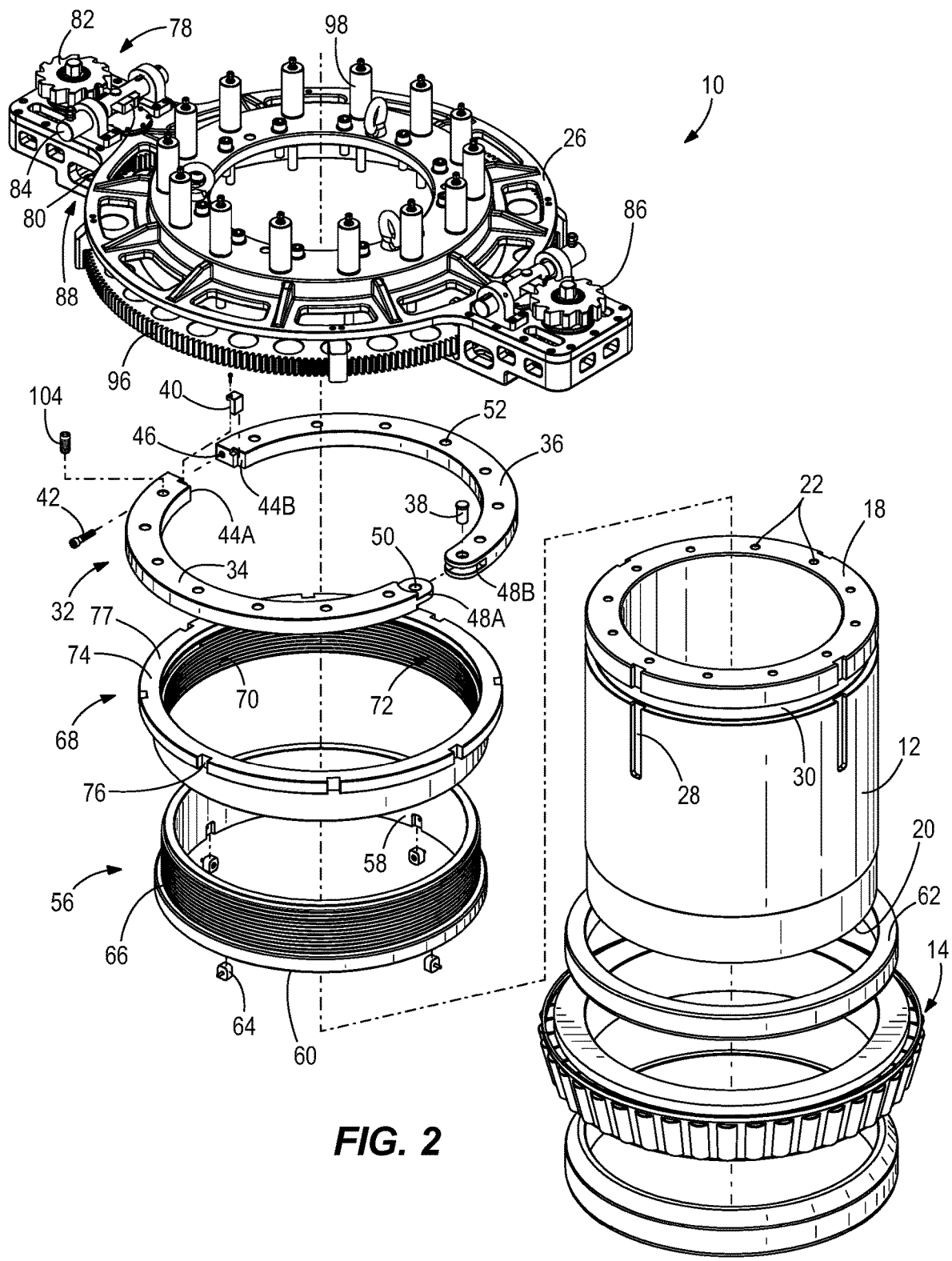
FIG. 2 is a partially exploded view of the preloading apparatus of FIG. 1.

FIGS. 1-2 show a preloading apparatus 10 positioned on a shaft 12 for preloading a bearing assembly 14 (FIG. 2). The shaft 12 is tubular with a circular cross-section. As shown, the shaft 12 is a large (e.g., outside diameter of 850 millimeters) hollow tube made of metal (e.g., steel, caster iron, etc.). Alternatively, the shaft 12 may be utilized for applications of smaller or larger sizes, scaling to suit the application. The shaft 12 extends in an axial direction (parallel to axis 16) from a first end 18 to a second end 20. When installing the bearing assembly 14, the bearing assembly 14 is placed over the first end 18 and is translated to a position between the first end 18 and the second end 20. The bearing assembly 14 is held in place partly by a housing 54, however, radial and axial clearances within the bearing assembly 14 are present, as the bearing assembly 14 has not yet been preloaded. The shaft 12 is provided with additional features which aid in the preloading process, which are described in greater detail below.

Figure 3:
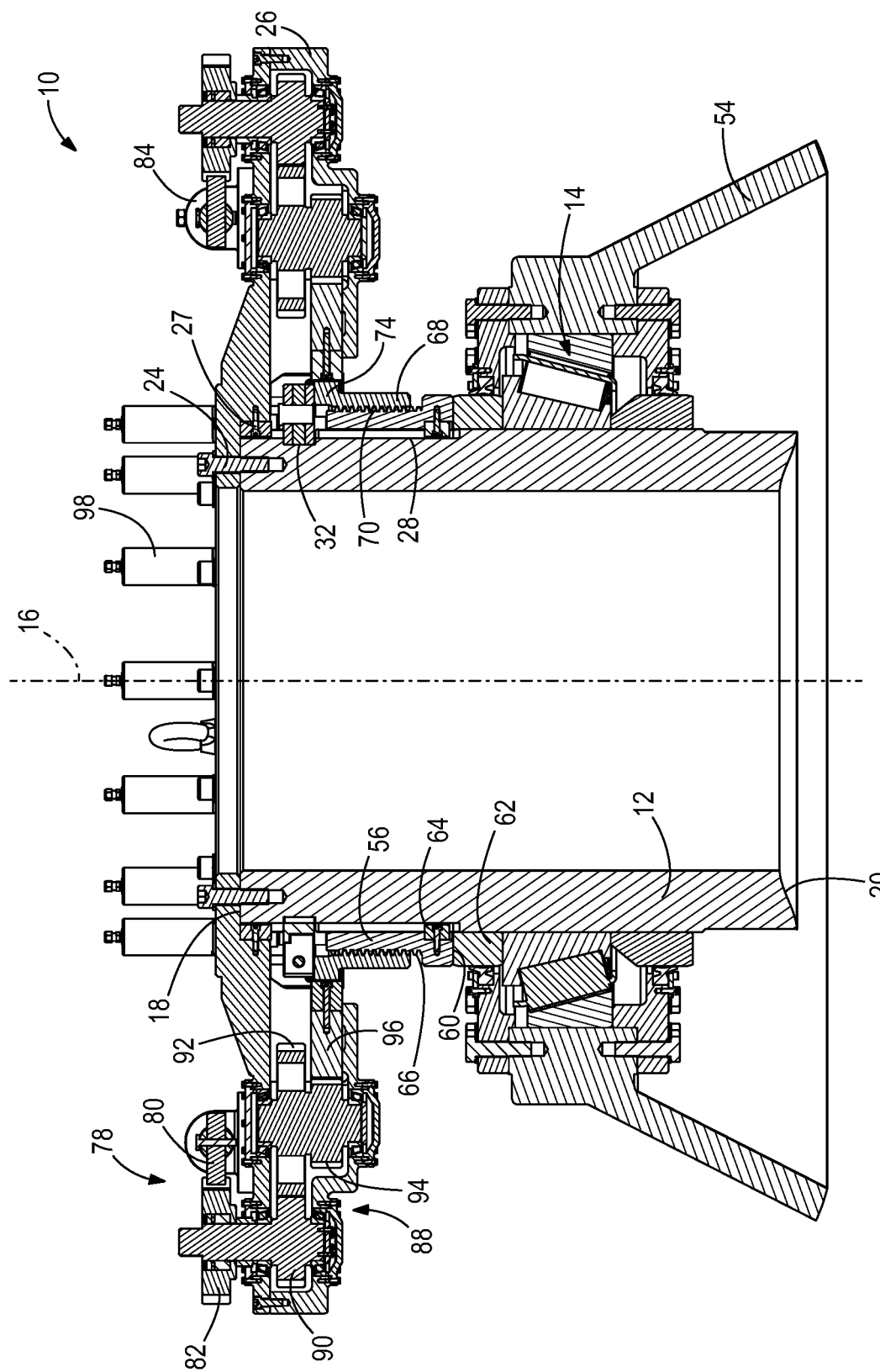
FIG. 3 is a cross-sectional front view of the preloading apparatus of FIG. 1.
Figure 4:
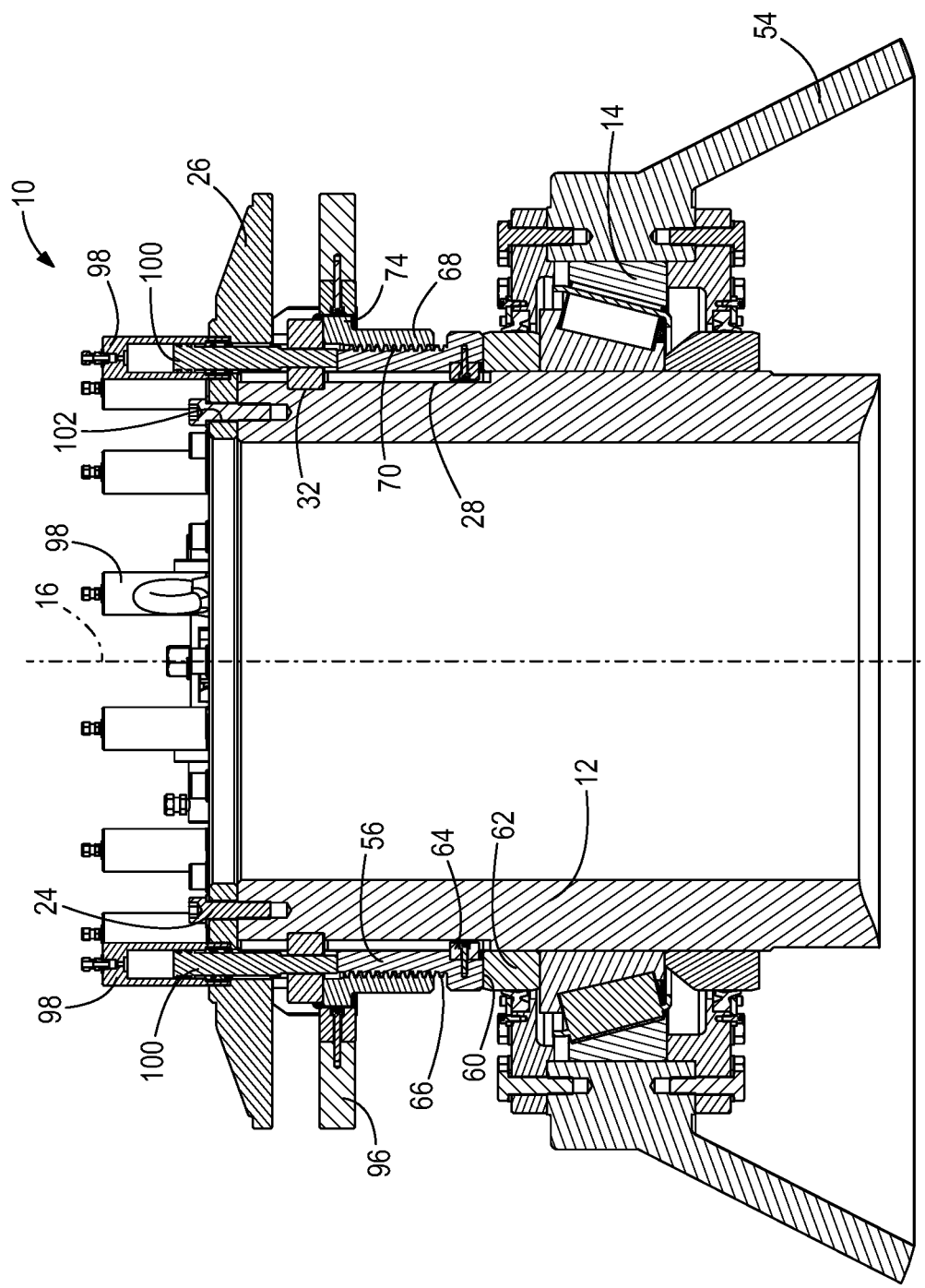
FIG. 4 is a cross-sectional side view of the preloading apparatus of FIG. 1.

The first end 18 of the shaft 12 includes a plurality of evenly-spaced apertures 22 that extend axially into the shaft 12. As shown, the twelve apertures 22 are collectively centered upon the axis 16 of the shaft 12 and each aperture 22 is radially spaced apart from the adjacent aperture 22 by thirty degrees. As shown in FIGS. 3-4, the apertures 22 accept fasteners 24 (e.g., pins, bolts, etc.) for temporarily fixing a mounting member 26 to the shaft 12. The mounting member 26 is described in more detail below.

Additionally, the shaft 12 includes a plurality of vertical keyway channels 28 equally spaced apart from one another and extending from the first end 18 toward the location of the installed bearing assembly 14. The shaft 12 further includes a circumferential channel 30 recessed into the outer periphery of the shaft 12 and extending around the entirety of the shaft 12. The circumferential channel 30 supports a split ring 32.

As shown in FIG. 2, the split ring 32 includes two split ring halves, a first half 34 and a second half 36. When combined, the arcuate split ring halves 34, 36 form an annular ring member with an interior diameter equal to the diameter of the recessed circumferential channel 30, accounting for clearance considerations. The halves 34, 36 are connected to one another via a pin 38 at one end and a key 40 and fastener 42 (e.g., screw, bolt, etc.) at the other end to permit installation of the split ring 32 within the channel 30. One end of the first half 34 includes a tongue 48A and one end of the second half 36 includes a groove 48B sized to accept the tongue 48A. An aperture 50 extends axially through the tongue 48A and groove 48B to permit placement of the pin 38 when the tongue 48A is located within the groove 48B. The key 40 is installed (e.g., fastened with a screw) within a cutout 44A of the first half 34 and is aligned with the cutout 44B of the second half 36. The fastener 42 is installed through an aperture 46 which extends perpendicular to the axial direction and in both halves 34, 36. The split ring 32 additionally includes a plurality of apertures 52 (i.e., fourteen threaded apertures) that are evenly spaced from one another and extend through the split ring 32 in the axial direction. The apertures 52 are spaced radially from the central axis 16 of the shaft 12 such that when the split ring 32 is installed on the shaft 12, the apertures 52 do not extend within the circumferential channel 30.

After the bearing assembly 14 is located on the shaft 12, a threaded pushing ring or first threaded member 56 is installed about the shaft 12. The first threaded member 56 is annular and includes an inner surface 58 with a diameter similar to the outer diameter of the shaft 12, accounting for clearance considerations. The first threaded member 56 is slidable over the end of the shaft 12 until a lower surface 60 of the first threaded member 56 abuts the bearing assembly 14. Alternatively, the lower surface 60 of the first threaded member 56 may abut an end ring 62 (as shown), spacer, or other component that is operable to provide a first axial force upon the bearing assembly 14. The first threaded member 56 is rotationally fixed relative to the shaft 12 via a plurality of keys 64 which are attached to the inner surface 58, and which extend within the inner diameter of the first threaded member 56 to mate with the vertical keyway channels 28. Therefore, the first threaded member 56 is capable of axial translation relative to the shaft 12, but is not capable of rotation relative to the shaft 12. The first threaded member 56 further includes external threads 66 which intermesh with a second threaded member 68.

The thread rotating ring or second threaded member 68 is an annular member that includes internal threads 70 in a threaded portion 72. The internal threads 70 intermesh with the threads 66 of the first threaded member 56. The second threaded member 68 further includes an upper lip 74 which extends radially outward from the threaded portion 72. The circumferential periphery of the upper lip 74 includes a plurality of keyways 76 (e.g., eight keyways) for fastening the second threaded member 68 to a gear (described in more detail below). A top surface 77 of the upper lip 74 is annular with an inner diameter less than the outer diameter of the split ring 32. Therefore, when the split ring 32 is adjacent the second threaded member 68, the top surface 77 of the upper lip 74 abuts the split ring 32 to limit axial movement of the second threaded member 68 in a direction away from the bearing assembly 14 (i.e., up in FIG. 3).

With the first threaded member 56 rotationally fixed (i.e., via interaction of the keys 64 and the vertical keyway channels 28) and axial translation of the second threaded member 68 in an upward direction limited by the split ring 32, a rotation of the second threaded member 68 is transformed into axial translation of the first threaded member 56 via the intermeshing threads 66, 70. Specifically, one full rotation of the second threaded member 68 translates the first threaded member 56 by the pitch of the intermeshing threads 66, 70.

As shown in FIG. 1, two actuators such as pawl and ratchet arrangements 78 are provided on the mounting member 26 to rotate the second threaded member 68. Each pawl and ratchet arrangement 78 includes a pawl 80 and a ratchet wheel 82. The pawl 80 is actuated by a hydraulic cylinder 84 to increment the ratchet wheel 82 in discrete increments. For example, each ratchet wheel 82 shown in FIG. 1 includes twelve teeth 86. As the hydraulic cylinder 84 actuates the pawl 80, the ratchet wheel 82 rotates a single increment such that the pawl 80 grabs the next tooth 86. This incremental step allows for precise, repeatable, and calculated preloading. Other embodiments may be equipped with only a single pawl and ratchet arrangement 78.

A drivetrain 88 comprises a plurality of intermeshing gears that transmit the rotation of the ratchet wheel 82 to the second threaded member 68. As shown in FIG. 3, the drivetrain 88 of each pawl and ratchet arrangement 78 includes four gears. The first gear 90 is coaxial with the ratchet wheel 82 to rotate a full revolution as the ratchet wheel 82 rotates a full revolution. A second gear 92 engages or intermeshes with the first gear 90 to transmit the force to a third gear 94. The third gear 94 is coaxial with the second gear 92 to rotate a full revolution as the second gear 92 rotates a full revolution. The fourth gear or last gear 96 is coaxial with the second threaded member 68 and the shaft 12 and engages or intermeshes with the third gear 94 to transmit the force to the second threaded member 68. The fourth gear is attached (e.g., keyed) to the second threaded member 68 as described above to directly transmit the rotational force to the second threaded member 68.

As shown, the ratchet wheel 82 includes twelve teeth 86, the first gear 90 includes twenty-seven teeth, the second gear 92 includes fifty teeth, the third gear 94 includes twenty-one teeth, and the last gear 96 includes two hundred eighteen teeth. Therefore, when the pawl 80 is actuated to rotate the ratchet wheel 82 by a single increment, both the ratchet wheel 82 and the first gear 90 rotate by 30 degrees. As the second gear 92 includes more teeth than the first gear 90, the second gear 92 rotates by 16.2 degrees. The third gear 94 is coaxial with the second gear 92 and therefore also rotates 16.2 degrees per increment of the ratchet wheel 82. As the last gear 96 includes more teeth than the third gear 94, the last gear 96 rotates 1.56 degrees per increment of the ratchet wheel 82. Therefore, it takes approximately 231 increments (i.e., over 19 full rotations of the ratchet wheel 82) to rotate the last gear 96 one full rotation. The intermeshing threads 66, 70 of the first and second threaded members 56, 68 have a pitch of twelve millimeters. Therefore, each increment of the pawl and ratchet arrangement 78 translates the first threaded member 56 relative to the second threaded member 68 by approximately 0.052 millimeters or 0.002 inches. Therefore, the preloading apparatus 10 is capable of minimal and precise adjustments when preloading the bearing assembly 14. In other embodiments, different gear ratios and pitch values can be substituted as desired to achieve the desired accuracy and precision. A displacement sensor (not shown) may be located on the bearing assembly 14 or first threaded member 56 and used to monitor and verify the bearing preload setting start point and the displacement of the first threaded member 56.

When converting rotational movement of the second threaded member 68 to axial translation of the first threaded member 56, an increased friction force or rotational torque exists between the intermeshing threads 66, 70 of the threaded members 56, 68 due to the constraints placed on the threaded members 56, 68 (i.e., prohibiting rotation of the first threaded member 56, prohibiting translation of the second threaded member 68 away from the bearing assembly 14). This friction force is transmitted through each drivetrain 88 to the respective pawl and ratchet arrangement 78. In order to reduce the friction force, linear actuators 98 are evenly spaced circumferentially about the shaft 12 and are supported by the mounting member 26. Each linear actuator 98 includes a piston 100 (FIG. 4) which translates between a retracted position and an extended position. When in the extended position, the piston 100 extends through one of the apertures 52 in the split ring 32 to contact the first threaded member 56. When actuated with the pawl and ratchet arrangements 78, the linear actuators 98 provide a second axial force (i.e., a downward force) upon the first threaded member 56 to reduce the friction between the intermeshing threads 66, 70, thereby reducing the force required to actuate or increment the pawl and ratchet arrangements 78. As the first threaded member 56 translates axially via rotation of the second threaded member 68, the pistons 100 of the linear actuators 98 extend to maintain a constant force (i.e., the second force) upon the first threaded member 56. In the illustrated embodiment, the linear actuators 98 are hydraulic cylinders, though other devices could also be used.

The second axial force provided by the linear actuators 98 is not great enough to preload the bearing assembly 14 and is only capable of reducing the friction between the intermeshing threads 66, 70. Further, the structure of the mounting member 26 (i.e., the portion of the mounting member 26 located below the last gear 96) along with the intermeshing threads 66, 70 of the first and second threaded members 56, 68 prevents axial translation of the first threaded member 56 without rotation of the second threaded member 68. Therefore, the linear actuators 98 are not capable of preloading the bearing assembly 14 on their own. Further, if the linear actuators 98 were capable of preloading the bearing assembly 14 without the use of the pawl and ratchet arrangement 78 and the drivetrain 88, the installation process would lose the accuracy and precision provided by the overall preloading apparatus 10.

The mounting member 26 is a body which supports the pawl and ratchet arrangements 78 and associated drivetrains 88, as well as the plurality of linear actuators 98. The mounting member 26 further includes a plurality of apertures 102 (FIG. 4) that align with the apertures 22 on the top surface of the shaft 12 to temporarily fix the mounting member 26 to the shaft 12 via the fasteners 24, thereby also fixing the placement of the pawl and ratchet arrangements 78, drivetrains 88, and linear actuators 98 relative to the shaft 12. The mounting member 26 is further rotationally fixed to the shaft 12 via a plurality of pins 27 (FIG. 3). The pins 27 are keyed to the keyway channels 28 to reduce shear stress on the fasteners 24 when the pawl and ratchet arrangement 78 is actuated.

Figure 5:
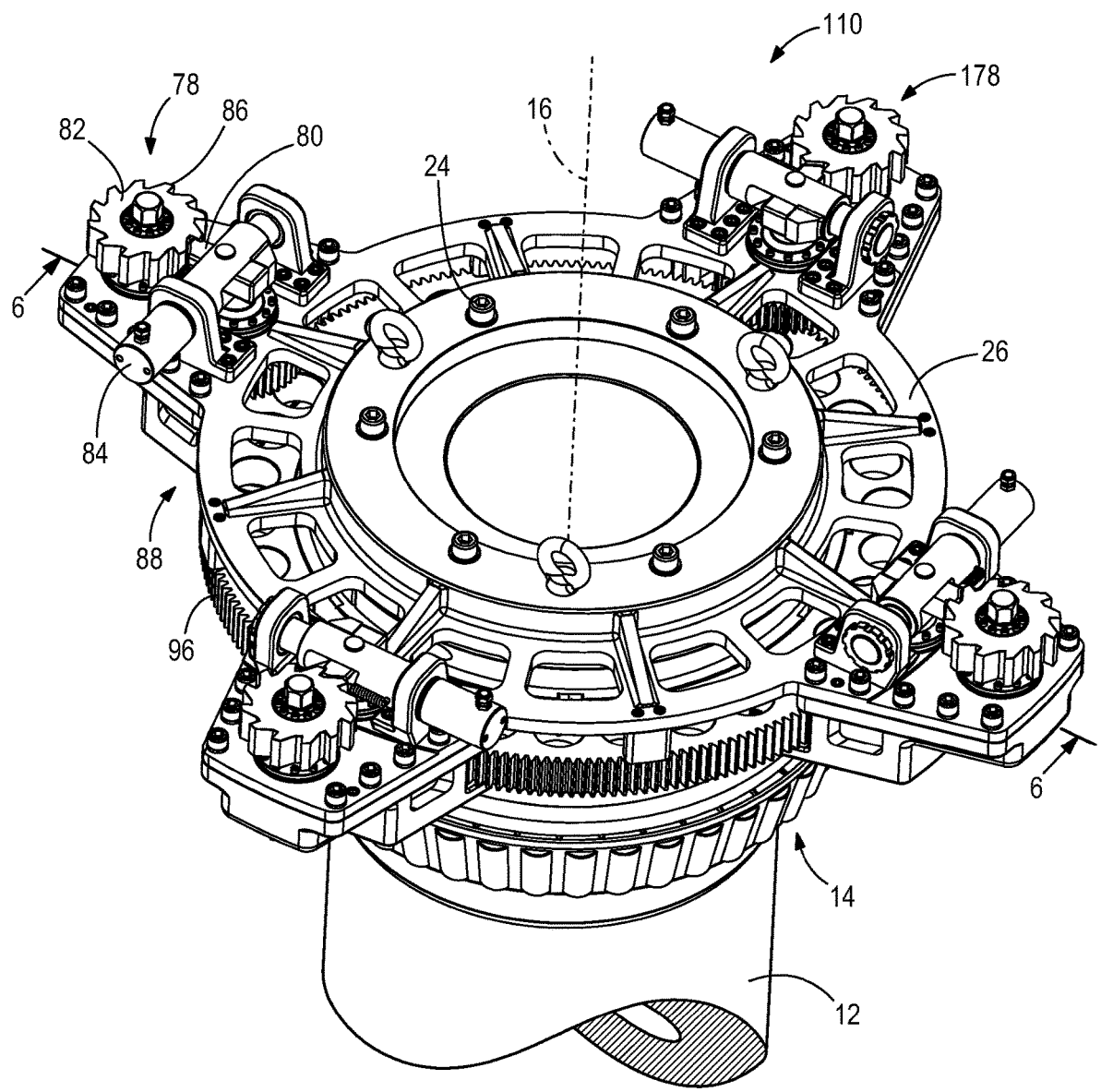
FIG. 5 is a perspective view of a preloading apparatus according to another embodiment of the invention and shown with a portion of the bearing assembly and housing structure removed.
Figure 6:
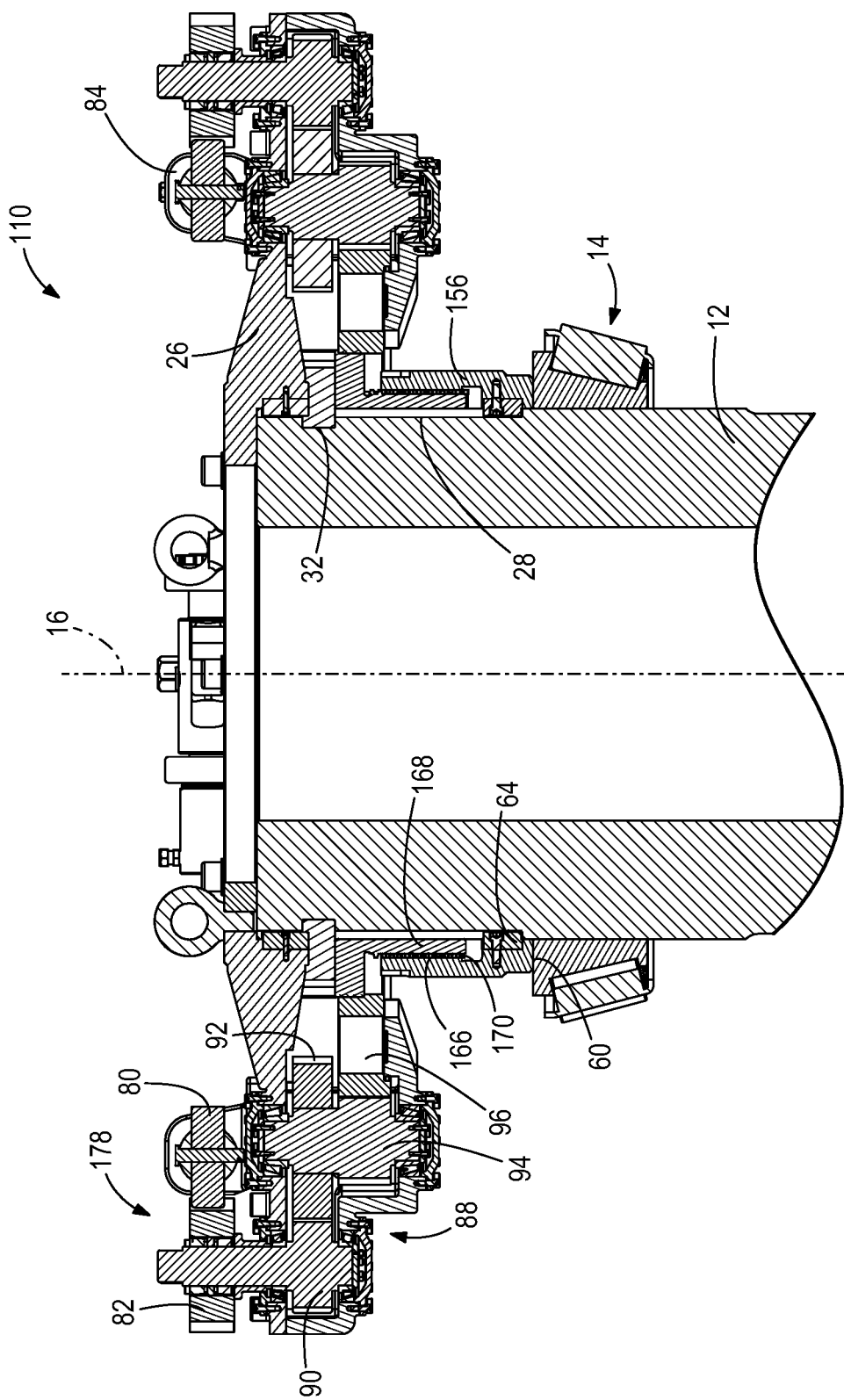
FIG. 6 is a cross-sectional front view of the preloading apparatus of FIG. 5.

As shown in FIGS. 5-6, an alternative preloading apparatus 110 may not include the linear actuators 98 to reduce the friction between the intermeshing threads 66, 70 of the first and second threaded members 56, 68. Like parts have been given like reference numbers. In order to overcome the increase in friction and rotational forces, additional pawl and ratchet arrangements 78 may be used. Increasing the number of pawl and ratchet arrangements 78 decreases the frictional force which needs to be overcome per arrangement. As shown, the embodiment shown in FIGS. 5-6 includes four pawl and ratchet arrangements 78. Other embodiments might include three, five, six, or more pawl and ratchet arrangements 78. Another difference from the first embodiment (FIGS. 1-4) is that the second threaded member 168 includes external threads 170 which intermesh with internal threads 166 of the first threaded member 156 to drive axial movement of the first threaded member 156. Yet another difference is that the first threaded member 156 directly engages the bearing assembly 14 (e.g., an inner race ring of the bearing assembly 14) as opposed to an end ring or spacer.

While the embodiment shown in FIGS. 5-6 is operable by increasing the number of pawl and ratchet arrangements 78 to overcome the substantial force resisting rotation, the use of linear actuators 98 in the first embodiment (FIGS. 1-4) decreases the number of pawl and ratchet arrangements 78 needed, or alternatively decreases the size of gear teeth and threads and the number of gears and teeth that are required to translate the first threaded member 56 based on the same number of pawl and ratchet arrangements 78. Therefore, the weight of the preloading apparatus 10 and cost to manufacture are likewise decreased via a reduction in material needed.

With respect to the preloading apparatus 10 shown in FIGS. 1-4, prior to preloading the bearing assembly 14, the bearing assembly 14 is positioned on the shaft 12. Due to tight clearances between the bearing assembly 14 and the shaft 12, the bearing assembly 14 may be heated prior to installation. Once the bearing assembly 14 is cooled and properly positioned (i.e., the bearing assembly 14 is located in the final position, not accounting for compression due to the preloading), the first threaded member 56 is positioned on the shaft 12, abutting the bearing assembly 14 or an intervening component (e.g., the end ring 62) abutting the bearing assembly 14. The first threaded member 56 is keyed to the shaft 12 to prevent rotation of the first threaded member 56 relative to the shaft 12. The second threaded member 68 is threaded to the first threaded member 56 via the intermeshing threads 66, 70. The split ring 32 is positioned within the channel 30 of the shaft 12 and is held in place via the pin 38 and key 40. The second threaded member 68 is rotated relative to the first threaded member 56 until the top surface 77 of the lip 74 of the second threaded member 68 abuts the split ring 32 as the first threaded member 56 abuts the bearing assembly 14. The last gear 96, coaxial with the second threaded member 68, is keyed to the second threaded member 68 such that rotation of the last gear 96 by a specified angle rotates the second threaded member 68 by the same angle. The mounting member 26, which supports the pawl and ratchet arrangements 78, drivetrains 88, and linear actuators 98, is fixed to the shaft 12 via the fasteners 24 and the keyed pins 27. The keyed pins 27 facilitate alignment of the mounting member 26 relative to the shaft 12. Each fastener 24 is placed through one of the apertures 102 in the mounting member 26 and into the corresponding aperture 22 in the end of the shaft 12. Additionally, the third gear 94 of the drivetrains 88 is aligned with the last gear 96 such that the teeth of the third gear 94 and the last gear 96 intermesh with one another.

Once assembly is completed, the pistons 100 of the linear actuators 98 are extended through the split ring 32 to deliver the second axial force downward upon the first threaded member 56 to alleviate some of the friction force resisting rotation between the first and second threaded members 56, 68. The pawls 80 are actuated simultaneously to rotate the respective ratchet wheels 82. The drivetrain 88 transmits the rotation of the ratchet wheel 82 to the last gear 96, which rotates the second threaded member 68. With the split ring 32 preventing translation of the second threaded member 68 away from the bearing assembly 14, the first threaded member 56 is translated axially toward the bearing assembly 14 to provide the first axial force to the bearing assembly 14. With a known axial force or compressive distance to preload the bearing assembly 14, the pawl 80 is actuated a number of times until the known force or distance is achieved. For example, if the bearing assembly 14 requires compression of 1.3 millimeters for preloading, and each actuation of the pawl 80 axially translates the first threaded member 56 by 0.052 millimeters, the pawl 80 is actuated twenty-five times to accurately preload the bearing assembly 14.

Once the preload is set, the pistons 100 are retracted to remove the second axial force. The last gear 96 is uncoupled from the second threaded member 68 and the mounting member 26, including the elements mounted to the mounting member 26 (i.e., pawl and ratchet arrangements 78, drivetrains 88, linear actuators 98), are removed from the shaft 12. The split ring 32, first threaded member 56, and second threaded member 68 remain about the shaft 12 to retain the preload. A large frictional force exists between the intermeshing threads 66, 70 to prevent relative rotation of the intermeshing threads and removal of the preload, however, one or more screw lock pins 104 (FIG. 2) can be threadably or otherwise engaged with the split ring 32 through each of the apertures 52 in the split ring 32 to further limit removal of the preload.

In the alternative structure shown in FIGS. 5-6, the process of installation and preloading is similar to the process described with respect to FIGS. 1-4; however, linear actuators 98 are not used to reduce the friction between the intermeshing threads 66, 70 of the first and second threaded members 56, 68. Instead, two additional pawl and ratchet arrangements 78 (and corresponding drivetrains 88) are utilized to overcome the frictional/rotative force required to rotate the second threaded member 68.

Various features and advantages of the invention are set forth in the following claims.

The invention claimed is:

1. An apparatus for preloading a bearing assembly on a shaft, the apparatus comprising:
   a first annular threaded member positioned about the shaft;
   a second annular threaded member positioned about the shaft;
   the first and second threaded members having intermeshing threads such that rotation of the second threaded member causes axial translation of the first threaded member to apply a first axial force to the bearing assembly to preload the bearing assembly;
   a first actuator operable to rotate the second threaded member relative to the first threaded member to apply the first axial force to the bearing assembly; and
   a plurality of additional linear actuators providing a second axial force to the first threaded member in a direction to reduce friction between the intermeshing threads.

2. The apparatus of claim 1, wherein the first actuator is a pawl and ratchet arrangement operable to rotate the second threaded member relative to the first threaded member to apply the first axial force to the bearing assembly.

3. The apparatus of claim 2, wherein the pawl and ratchet arrangement is hydraulically actuated.

4. The apparatus of claim 2, wherein the pawl and ratchet arrangement is one of a plurality of pawl and ratchet arrangements, wherein the second threaded member is rotatably driveable via the plurality of pawl and ratchet arrangements.

5. The apparatus of claim 2, further comprising a drivetrain including a first gear and a last gear, wherein the pawl and ratchet arrangement drives the first gear and the last gear drives the second threaded member.

6. The apparatus of claim 5, wherein the last gear is coupled to the second threaded member and is centered about the shaft.

7. The apparatus of claim 2, further comprising a mounting member fixed to the shaft, wherein the pawl and ratchet arrangement is supported by the mounting member.

8. The apparatus of claim 1, wherein the shaft includes an outer diameter, the apparatus further comprising a ring axially fixed relative to the shaft, the ring including an outer diameter greater than the outer diameter of the shaft, wherein the second threaded member abuts the ring to prevent axial movement of the second threaded member away from the bearing assembly.

9. The apparatus of claim 1, wherein the first threaded member is keyed to a vertical keyway channel of the shaft to prevent rotation of the first threaded member relative to the shaft.

10. The apparatus of claim 1, wherein each of the plurality of linear actuators includes a piston operable to translate between an extended position and a retracted position, wherein, in the extended position, the pistons provide the second axial force to the first threaded member.

11. The apparatus of claim 1, wherein the first actuator is a pawl and ratchet arrangement and wherein the pawl and ratchet arrangement and the plurality of linear actuators are hydraulically actuated.

12. A method of preloading a bearing assembly on a shaft, the method comprising:
   fixing a first annular threaded member rotationally relatively to the shaft to prevent rotation of the first threaded member about the shaft;
   threadably engaging a second annular threaded member positioned about the shaft to the first threaded member via intermeshing threads;
   rotating the second threaded member relative to the first threaded member such that axial movement of the first threaded member applies a first axial force to the bearing assembly to preload the bearing assembly; and
   applying a second axial force via a plurality of linear actuators to one of the first threaded member and the second threaded member, the second axial force applied in a direction that reduces friction between the threaded engagement of the first threaded member and the second threaded member as the second threaded member is rotated.

13. The method of claim 12, wherein a pawl and ratchet arrangement is actuated to rotate the second threaded member relative to the first threaded member.

14. The method of claim 13, wherein actuating the pawl and ratchet arrangement further comprises actuating the pawl and ratchet arrangement with a hydraulic actuator, such that a ratchet wheel of the pawl and ratchet arrangement rotates in discrete increments.

15. The method of claim 13, wherein the pawl and ratchet system drives the second threaded member via a drivetrain including a first gear and a last gear and wherein a full rotation of the first gear produces less than a full rotation of the last gear.

16. The method of claim 15, wherein the last gear is coupled to the second threaded member such that a full rotation of the last gear results in a full rotation of the second threaded member.

17. The method of claim 13, wherein the pawl and ratchet arrangement is one of a plurality of pawl and ratchet arrangements, wherein the plurality of pawl and ratchet arrangements collectively drive the second threaded member relative to the first threaded member to preload the bearing assembly.

18. The method of claim 13, further comprising fixing a mounting member to the shaft, wherein the pawl and ratchet arrangement are coupled to the mounting member.

19. The method of claim 12, wherein fixing the first threaded member rotationally relative to the shaft includes keying the first threaded member to a keyway channel of the shaft.

20. The method of claim 12, further comprising preventing axial movement of the second threaded member away from the bearing assembly when rotating the second threaded member relative to the first threaded member.

21. The method of claim 12, wherein the first axial force is applied simultaneously with the second axial force.

22. The method of claim 12, wherein the second axial force is applied to the first threaded member.

23. The method of claim 12, wherein each of the plurality of linear actuators includes a piston, and wherein applying the second axial force to one of the first and second threaded members includes hydraulically actuating the pistons to contact the first threaded member.

\* \* \* \* \*